(12) United States Patent
Chopra et al.

(10) Patent No.: US 8,747,535 B1
(45) Date of Patent: Jun. 10, 2014

(54) SOLID INK COMPOSITIONS COMPRISING CRYSTALLINE-AMORPHOUS MIXTURES

(71) Applicant: Xerox Corporation, Norwalk, CT (US)

(72) Inventors: Naveen Chopra, Oakville (CA);
Guerino Sacripante, Oakville (CA);
Adela Goredema, Mississauga (CA);
Kentaro Morimitsu, Mississauga (CA);
Stephan Drappel, Toronto (CA); Jeffrey Banning, Hillsboro, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/745,375

(22) Filed: Jan. 18, 2013

(51) Int. Cl.
*C09D 11/02* (2006.01)
(52) U.S. Cl.
USPC .................................. 106/31.29; 106/31.61
(58) Field of Classification Search
CPC ...................................................... C09D 11/34
USPC ........................................... 106/31.29, 31.61
See application file for complete search history.

(56) References Cited

U.S. PATENT DOCUMENTS

| | | | |
|---|---|---|---|
| 5,195,430 A | 3/1993 | Rise | |
| 5,231,135 A | 7/1993 | Machell et al. | |
| 5,389,958 A | 2/1995 | Bui et al. | |
| 5,621,022 A | 4/1997 | Jaeger et al. | |
| 6,221,137 B1 | 4/2001 | King et al. | |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,381,831 B1 | 6/2008 | Banning et al. | |
| 7,427,323 B1 | 9/2008 | Birau et al. | |
| 2012/0040287 A1* | 2/2012 | Wang et al. | 430/125.32 |

* cited by examiner

*Primary Examiner* — Veronica F Faison
(74) *Attorney, Agent, or Firm* — Pillsbury Winthrop Shaw Pittman LLP

(57) ABSTRACT

Ink compositions include an amorphous component, a crystalline material, and optionally a colorant. The amorphous component exhibits improved thermal stability and improved distribution in ink preparations; an ink composition includes an amorphous component including a modified polyol and a crystalline component, the modified polyol includes a biorenewable content of at least 35% by weight.

19 Claims, 2 Drawing Sheets

SOLID INK COMPOSITIONS COMPRISING CRYSTALLINE-AMORPHOUS MIXTURES

CROSS-REFERENCE TO RELATED APPLICATIONS

Reference is made to commonly owned and co-pending, U.S. patent application Ser. No. 13/745,495 (not yet assigned) entitled "CYCLOHEXYL-MANNITOL DIKETAL DERIVATIVES AS WAX MODIFIERS AND GELATORS" to Naveen Chopra et al., electronically filed on the same day herewith, the disclosure of which is hereby incorporated by reference in its entirety.

BACKGROUND

Embodiments disclosed herein relate to ink compositions comprising an amorphous component, a crystalline material, and optionally a colorant, and methods of making and using the same. In particular, embodiments disclosed herein relate to ink compositions comprising an amorphous component exhibiting improved thermal stability and improved distribution in ink preparations.

Ink jet printing processes may employ inks that are solid at room temperature and liquid at elevated temperatures. Such inks may be referred to as solid inks, hot melt inks, phase change inks and the like. Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

A recently developed phase change ink formulation utilizes a mixture of crystalline and amorphous materials. The crystalline material imparts a hardness and rapid phase change that is beneficial for direct-to-paper (DTP) print architectures. The amorphous material (typically a viscous, tacky material) aids in adhesion of the ink to the substrate and plasticizes the crystalline component to prevent embrittlement and cracking of the printed image. The majority of amorphous materials disclosed thus far have been ester-based materials. These crystalline-amorphous inks display improved robustness over known inks on coated substrates with respect to scratch, fold and fold offset. A commonly employed ester-based amorphous component is a derivative of L-tartaric acid/cyclohexanol/t-butylcyclohexanol (TBCT) which is considered to contribute to the acceptable robust images. However, TBCT suffers from several disadvantages, namely thermal stability during synthesis and variation in product distributions, both of which pose challenges for scale-up synthesis.

SUMMARY

According to embodiments illustrated herein, there are provided ink compositions comprising a mixture of crystalline and amorphous components that exhibit excellent image robustness for ink jet printing, including printing on coated paper substrates.

In some aspects, embodiments disclosed herein provide an ink composition comprising an amorphous component comprising a modified polyol and a crystalline component, wherein the modified polyol comprises a bio-renewable content of at least 35% by weight.

In other aspects, embodiments disclosed herein provide an ink comprising an amorphous component comprising an alditol bis-acetal, a crystalline component and a colorant selected from the group consisting of a pigment, dye or mixtures thereof, wherein the alditol bis-acetal comprises a bio-renewable content in a range of from about 50% to about 70% by weight.

In still other aspects, embodiments disclosed herein provide an ink comprising an amorphous component comprising a D-mannitol bis-acetal, a crystalline component and a colorant.

BRIEF DESCRIPTION OF THE DRAWINGS

For a better understanding of the present embodiments, reference may be made to the accompanying figures.

DETAILED DESCRIPTION

Figure 1:
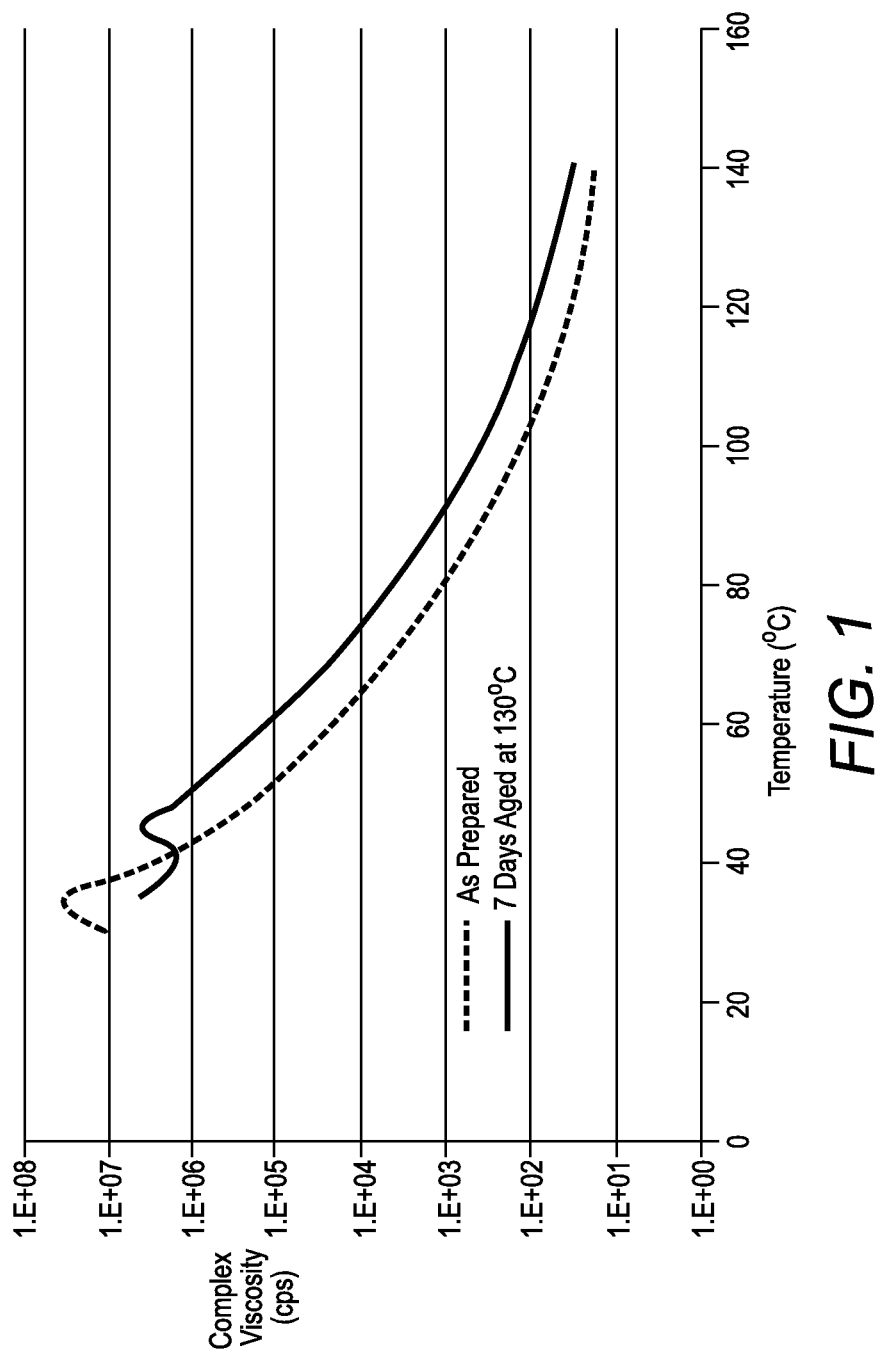
FIG. 1 shows a rheology curve of "as-is" versus aged amorphous compound 2.

In the following description, it is understood that other embodiments may be utilized and structural and operational changes may be made without departure from the scope of the present embodiments disclosed herein.

Solid ink technology broadens printing capability and customer base across many markets, and the diversity of printing applications may be facilitated by effective integration of printhead technology, print process and ink materials. The ink compositions disclosed herein are characterized as being solid at room temperature (e.g., 20-27° C.) and molten at an elevated temperature at which the molten ink is applied to a substrate.

It has been discovered that using a mixture of crystalline and amorphous components in solid ink formulations provides robust inks, and in particular, solid inks which demonstrate robust images on uncoated and coated paper. Embodiments disclosed herein provide further advantageous ink compositions comprising a new class of compounds as the amorphous component, namely modified polyols. These polyols are generally selected from a pool of naturally occurring polyols to enhance the overall bio-renewable content of the inks disclosed herein. For example, the use of polyols based on reduced naturally occurring monosaccharides provides an increase in bio-renewable content, including up to about 70%. Thus, the ink formulations described herein may comprise polyols that are alditols, i.e. reduced monosaccharides, such as D-mannitol. The polyols disclosed herein are generally modified as bis-acetal derivatives to provide the amorphous component of a phase change ink. These amorphous compounds can be readily prepared in a one-step reaction of the alditol and dimethoxyacetals, thus facilitating scale-up. As described herein further below in the Examples, these amorphous materials were formulated with a crystalline material and the resulting inks were printed on coated paper by K-proof. The print samples demonstrated improved robustness with respect to scratch, fold, and fold offset compared to known inks and were found to be comparable to current inks on the same media.

In some embodiments, there are provided ink compositions comprising an amorphous component comprising a modified polyol, and a crystalline component, wherein the modified polyol comprises a bio-renewable content of at least 35% by weight. As used herein, the term "polyol," refers to a polyhydroxylic organic compound generally of naturally occurring origin. Exemplary polyols include the sugar alcohols, i.e. alditols. Polyols useful in the manufacture of amorphous components of the phase change inks disclosed herein are generally derived from monosaccharides, but they can also be derived from disaccharides, such as, maltitol or isomalt. When a polyol is "modified," it is meant that the polyol is further functionalized to provide a compound that will serve as the amorphous component of a phase change ink. That is, the resultant modified polyol will lose any inherent crystalline character associated with the parent polyol, providing an amorphous compound, i.e. a compound lacking long range crystalline order. In accordance with exemplary embodiments disclosed herein, one such modification of a polyol includes the formation of its corresponding acetal, bis-acetal, or higher order acetals, i.e. the polyol is functionalized at one or more vicinal-diols by condensation with an aldehyde or ketone, or appropriate functional equivalent thereof, such as its dimethoxy acetal via transacetalization. In some embodiments, the modified polyol comprises an alditol bis-acetal. Other modifications may include the formation of orthoesters from either a vicinal-diol or a by reaction with a triad of adjacent hydroxyl groups in a triol.

The present embodiments use bio-renewable materials for use in the ink compositions. The term "bio-renewable" is used to mean a material comprised of one or more monomers that may be derived from plant material. By using such bio-derived feedstock, which are renewable, manufacturers may reduce their carbon footprint and move to a zero-carbon or carbon-neutral footprint. Bio-based materials are also very attractive in terms of specific energy and emission savings. Utilizing bio-renewable feedstock can decrease the amount of waste targeted for landfills, and reduce the economic risks and uncertainty associated with reliance on petroleum imported from unstable regions.

In some embodiments, the bio-renewable content of the modified polyols disclosed herein may be in a range from about 30% to about 90% by weight. In some embodiments, the bio-renewable content of the modified polyol is in a range of from about 50% to about 70% by weight. In other embodiments, the bio-renewable content of the modified polyol is in a range from about 60% to about 80%. One skilled in the art will appreciate that the exact amount of bio-renewable content can be tuned by selection of the agent used to modify the polyol. In some embodiments, the polyol is the source of bio-renewable content. In some embodiments, the reagent modifying the polyol can be selected from a pool of bio-renewable ketones or aldehydes. In some such embodiments, the amorphous component comprising the modified polyol may be 100% by weight bio-renewable since both reagents making up the amorphous component are bio-renewable. Exemplary reagents that can be used in the manufacture of amorphous components having 100% bio-renewable content include, without limitation, carvone, citral, vanillin, and cinnamaldehyde.

In some embodiments, the crystalline component of the inks disclosed herein may also be provided with high bio-renewable content, for example, from about 50% to about 100% by weight. In other embodiments, the crystalline component of the inks disclosed herein may be provided with a bio-renewable content in a range from about 70 to about 100% by weight or from about 80 to about 100% by weight. In some embodiments, the total bio-renewable content of the ink compositions disclosed herein may be in a range from about 25% to about 70% by weight. In other embodiments, the range of bio-renewable content may be in a range of from about 30% to about 65% by weight. In still further embodiments, the range of bio-renewable content may be in a range of from about 40% to about 60% by weight, wherein any of the recited ranges include all sub-ranges in between, including fractions thereof.

In some embodiments, the ink compositions disclosed herein comprise a viscosity in a range of from about 4 to about 12 centipoise, or from about 5 to about 10 centipoise at 140° C., making them suitable for use as phase change inks. In some embodiments, the viscosity may be in a range from about 5 to about 8 centipoise at 140° C., wherein any of the recited ranges include all sub-ranges in between, including fractions thereof. In some embodiments, the viscosity is about 10.5 centipoise or lower, but no less than about 4 centipoise.

In some embodiments, there are provided ink compositions comprising amorphous components comprising compounds of Formula I:

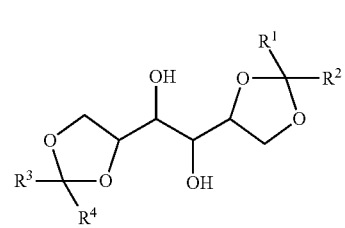

I wherein each of $R^1$, $R^2$, $R^3$, and $R^4$ independently comprises an optionally substituted $C_1$-$C_4$ alkyl, or each of $R^1$ together with $R^2$ and $R^3$ together with $R^4$ independently comprise a five- or six-membered ring cycloalkyl group, wherein each five- or six-membered ring cycloalkyl group is optionally substituted with a branched- or straight-chain alkyl, aryl, an arylalkyl, an alkylaryl, or a halogen, the ink compositions further comprising crystalline components.

The term "alkyl", either alone or within other terms such as "alkylaryl" and "arylalkyl", means a monovalent, saturated hydrocarbon radical which may be a straight chain (i.e. linear) or a branched chain. An alkyl radical generally comprises from about 1 to about 20 carbon atoms, particularly from about 1 to about 10, about 1 to about 8 or about 1 to about 6. Illustrative alkyl radicals include methyl, ethyl, n-propyl, n-butyl, n-pentyl, n-hexyl, isopropyl, isobutyl, isopentyl, amyl, sec-butyl, tert-butyl, tert-pentyl, n-heptyl, n-octyl, n-nonyl, n-decyl, undecyl, n-dodecyl, n-tetradecyl, pentadecyl, n-hexadecyl, heptadecyl, n-octadecyl, nonadecyl, eicosyl, docosyl, n-tetracosyl, and the like, along with branched variations thereof. In certain aspects, an alkyl radical is a $C_1$-$C_6$ lower alkyl comprising or selected from the group consisting of methyl, ethyl, n-propyl, n-butyl, n-pentyl, n-hexyl, isopropyl, isobutyl, isopentyl, amyl, tributyl, sec-butyl, tert-butyl, tert-pentyl, and n-hexyl. $C_1$-$C_4$ alkyl means methyl, ethyl, n-propyl, or n-butyl.

As used herein, the term "aryl," alone or in combination, refers to a carbocyclic aromatic system containing one or two rings wherein such rings may be attached together in a pendant manner or may be fused. The term "fused" means that a second ring is present (i.e, attached or formed) by having two adjacent atoms in common or shared with the first ring. An aryl radical may be optionally substituted with groups such as hydroxyl, alkyl, carbonyl, carboxyl, thiol, amino, and/or halogen. Illustrative "aryl" radicals includes without limitation aromatic radicals such as phenyl, benzyl, naphthyl, and indenyl.

As used herein the term "halogen" refers to fluorine, chlorine, bromine or iodine atoms.

Amorphous compounds of Formula I may be derived from alditols, i.e., the reduced form of an aldose monosaccharide. Exemplary alditols can include, without limitation, mannitol, galactitol, glucitol (sorbitol), allitol, gulitol, talitol, and iditol, each of which may be provided in its naturally occurring stereochemical configuration or unnaturally occurring stereochemical configuration. In some embodiments, the stereochemical configuration of the alditol is the naturally occurring configuration. One skilled in the art will recognize that while the alditol examples provided above are based on aldohexose monosaccharides, similar results may be obtained by employing bis-acetal derivatives of alditols derived from aldopentose monosaccharides, such as arabinose, ribose, lyxose, and xylose.

Compounds of Formula I further comprise a bis-acetal (or as used herein synonymously, bis-ketal) functional group which can be derived from an appropriate substituted- or unsubstituted-acyclic ketone derivative or a substituted- or unsubstituted-cyclohexanone or cyclopentanone derivative. By way of example, one such bis-acetal structure of Formula I can be accessed via transacetalization of a cyclohexanone dimethoxyacetal. One skilled in the art will recognize that unsymmetrical acyclic acetals may be accessible from appropriate ketone-based reagents. For example, a methyl ethyl ketal may be formed from an appropriate butanone reagent such as 2,2-dimethoxybutane.

In some embodiments, in compounds of Formula I, each of $R^1$ together with $R^2$ and $R^3$ together with $R^4$ comprise a cyclohexyl group. In some such embodiments, each cyclohexyl group may further independently comprise a substitution selected from methyl, ethyl, n-propyl, isopropyl, n-butyl, i-butyl, t-butyl, or optionally substituted phenyl. For example, in some embodiments, each cyclohexyl group may comprise t-butyl substitution. In other embodiments, each cyclohexyl group may comprise phenyl substitution. In still further embodiments, each cyclohexyl group may comprise methyl substitution. In some embodiments, each cyclohexyl group substitution may be attached at the 4 position of the cyclohexyl group.

In some embodiments, the amorphous component comprises a compound of Formula II:

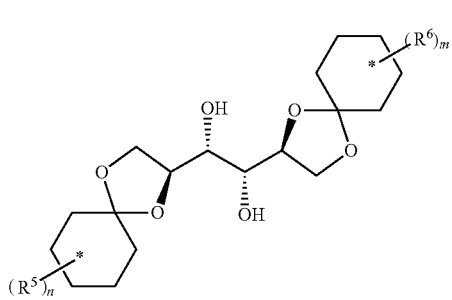

II wherein $R^5$ and $R^6$ comprise a substitution selected from methyl, ethyl, n-propyl, isopropyl, n-butyl, i-butyl, t-butyl, or optionally substituted phenyl, and m and n are independently integers from 0 to 3.

Specific examples of amorphous components useful in ink compositions disclosed herein include, without limitation, amorphous compounds 1-6:

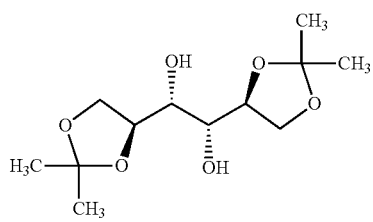

1

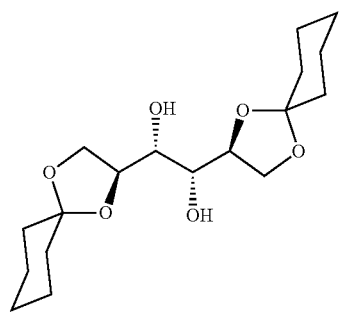

2

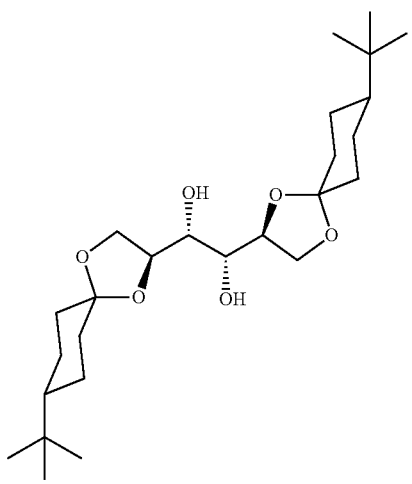

3

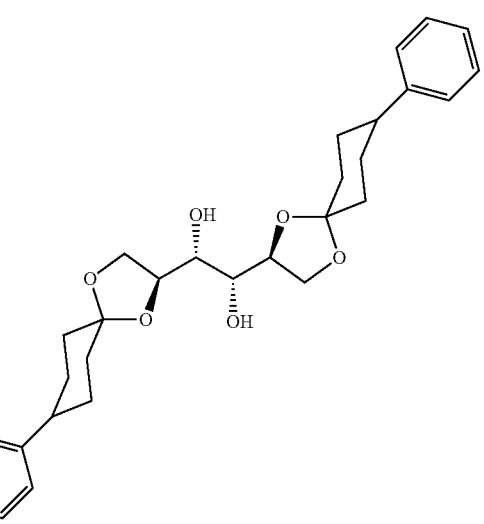

4

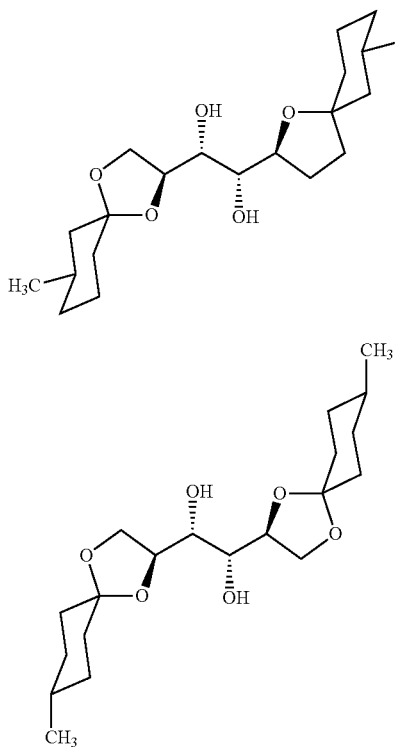

Compound 1, in particular, comprises an acyclic ketone acetal (acetonide). In some embodiments, D-mannitol bis-acetals may be based on such acyclic ketones, such as acetone, propanone, butanone, and the like. In other embodiments, D-mannitol bis acetals may be based on substituted- or unsubstituted-cyclohexanones.

In some embodiments, there are provided inks comprising an amorphous component comprising an alditol bis-acetal, a crystalline component, and a colorant selected from the group consisting of a pigment, dye or mixtures thereof, wherein the alditol bis-acetal comprises a bio-renewable content in a range of from about 50% to about 70% by weight.

In some embodiments, there are provided inks comprising an amorphous component comprising a D-mannitol bis-acetal, a crystalline component, and a colorant. In some such embodiments, the D-mannitol bis-acetal may comprise a bio-renewable content in a range of from about 50% to about 70% by weight.

The amorphous components disclosed herein can provide tackiness and impart robustness to the printed ink. In the present embodiments, desirable amorphous materials have relatively low viscosity (less than about $10^2$ cps, or from about 1 to about 100 cps, or from about 5 to about 95 cps) at about 140° C., but very high viscosity (greater than about $10^6$ cps) at room temperature. The low viscosity at 140° C. provides wide formulation latitude while the high viscosity at room temperature imparts robustness. The amorphous materials have $T_g$'s (glass transition temperatures) but do not exhibit crystallization and melting peaks by DSC (10° C./min from −50 to 200 to −50° C.). The $T_g$ values are typically from about 10 to about 50° C., or from about 10 to about 40° C., or from about 10 to about 35° C., to impart the desired toughness and flexibility to the inks. The selected amorphous materials have low molecular weights, such as less than 1000 g/mol, or from about 100 to about 1000 g/mol, or from about 200 to about 1000 g/mol, or from about 300 to about 1000 g/mol. Higher molecular weight amorphous materials such as polymers become viscous and sticky liquids at high temperatures, but have viscosities that may be too high to be jettable with piezoelectric printheads at desirable temperatures.

In some embodiments, the amorphous component may be present in ink compositions in an amount of from about 5 to about 40 weight percent, including any value in between and fractions thereof. In some embodiments, the amorphous component may be present in ink compositions in an amount of from about 10 to about 30 weight percent, including any value in between and fractions thereof. In some embodiments, the amorphous component may be present in ink compositions in an amount of from about 15 to about 25 weight percent, including any value in between and fractions thereof. One skilled in the art will recognize that the exact choice of amount of the amorphous component may be influenced by, inter alia, the selection of the crystalline component of the ink composition.

In some embodiments, there are provided inks comprising amorphous components comprising a compound of Formula I:

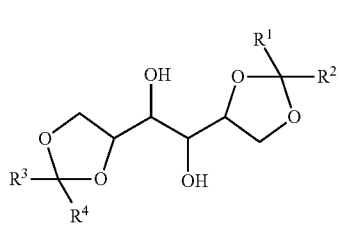

wherein each of $R^1$, $R^2$, $R^3$, and $R^4$ independently comprises an optionally substituted $C_1$-$C_4$ alkyl, or each of $R^1$ together with $R^2$ and $R^3$ together with $R^4$ independently comprise a five- or six-membered ring cycloalkyl group, wherein each five- or six-membered ring cycloalkyl group is optionally substituted with a branched- or straight-chain alkyl, aryl, an arylalkyl, an alkylaryl, or a halogen, and the inks further comprising crystalline components comprising di-ester compounds of Formula III:

wherein R and R' can be the same or different, and wherein R and R' each independently comprise a saturated or ethylenically unsaturated aliphatic group, and the inks further comprising colorants selected from the group consisting of a pigment, dye or mixtures thereof. In particular embodiments, the amorphous component of Formula I comprises a stereochemical configuration of D-mannitol. In particular embodiments, the crystalline component comprises a distearyl terephthalate.

In some embodiments, R and R' are the same. In such embodiments, the crystalline compound comprises di-ester compounds prepared based on the reaction of Scheme 1 below.

Scheme 1

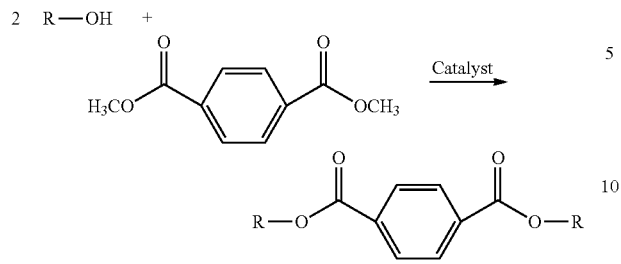

wherein R is a saturated or ethylenically unsaturated aliphatic group in one embodiment with at least about 6 carbon atoms, and in another embodiment with at least about 8 carbon atoms, and in one embodiment with no more than about 100 carbon atoms, in another embodiment with no more than about 80 carbon atoms, and in yet another embodiment with no more than about 60 carbon atoms, although the number of carbon atoms can be outside of these ranges, In a specific embodiment, the crystalline compound is derived from natural fatty alcohols such as octanol, stearyl alcohol, lauryl alcohol, behenyl alcohol, myristyl alcohol, capric alcohol, linoleyl alcohol, and the like. The above reaction may be conducted by combining dimethyl terephthalate and alcohol in the melt in the presence of a tin catalyst, such as, dibutyl tin dilaurate (Fascat 4202), dibutyl tin oxide (Fascat 4100); a zinc catalyst, such as Bi cat Z; or a bismuth catalyst, such as Bi cat 8124; Bi cat 8108, a titanium catalyst such as titanium dioxide Only trace quantities of catalyst are required for the process. In embodiments, the catalyst is present in an amount of about 0.01 weight percent to 2 weight percent or of about 0.05 weight percent to about 1 weight percent of the total product.

The reaction of Scheme 1 may be carried out at an elevated temperature of about 150° C. to about 250° C. or from about 160° C. to about 210° C. The solvent-free process is environmentally sustainable and eliminates problems with byproducts and also means higher reactor throughput.

Many alcohols are bio-renewable materials derived from plant oils such as cotton, coconut, palm kernel, castor beans, rapeseed, soybeans, and sunflowers. These alcohols are reacted with dimethyl terephthalate or terephthalic acid to give the corresponding di-ester. Bio-renewable terephthalic acid is not yet available, however, there is a strong effort by many companies to have it available in the next few years. Therefore, the potential of having 100% bio-renewable dialkyl terephthalates in the near future for use with the present embodiments is high.

Specific alcohols useful in preparing the di-ester compounds (for use as the crystalline compound) of Formula III are shown below in Table 1. All three diester compounds showed very sharp transitions within the desirable temperature range (i.e., 60° C.<T<130° C.) (Table 1) indicating promising properties for the phase changing material of the ink.

TABLE 1

| Diester | R—OH | Bio-renewable Content (%)* | $T_{melt}$ (° C.) (DSC) | $T_{cryst}$ (° C.) (DSC) | Viscosity at 140° C. (cps) |
|---|---|---|---|---|---|
| 1 | Stearyl alcohol ($CH_3(CH_2)_{17}OH$) | 80 | 88 | 79 | 4.5 |
| 2 | Behenyl Alcohol ($CH_3(CH_2)_{21}OH$) | 83 | 95 | 82 | 4.8 |
| 3 | Lauryl Alcohol ($CH_3(CH_2)_{11}OH$) | 73 | 70 | 60 | Not Determined |

*Note:
All these materials have a very high potential to have 100% BRC since there is a lot of effort in making bio-renewable TPA The bio-renewable content is based on the weight percent of bio-based materials. All of the starting materials used to make the crystalline components of the present embodiments are inexpensive. Moreover, these materials are prepared by simple, low-cost and environmentally benign synthetic routes using solvent-less condensation procedures with methanol as the only by-product.

Each ink component imparts specific properties to the solid inks, and the blend of the components may provide inks that exhibit excellent robustness on uncoated and coated substrates. Without being bound by theory, the crystalline component in the ink formulation may drive the phase change through rapid crystallization on cooling. The crystalline component may also set up the structure of the final ink film and creates a hard ink by reducing the tackiness of the amorphous component. The crystalline components exhibit crystallization, relatively low viscosity (less than or equal to about $10^1$ centipoise (cps), or from about 0.5 to about 10 cps, or from about 1 to about 10 cps) at about 140° C. and high viscosity (greater than about $10^6$ cps) at room temperature. Because the crystalline components dictate the phase change of the ink, rapid crystallization is required to allow further immediate print processing if required (i.e., spreading, duplex printing, etc.) and to prevent excessive showthrough on uncoated substrates. By differential scanning calorimetry (DSC) (10° C./min from –50 to 200 to –50° C.), desirable crystalline components show sharp crystallization and melting peaks, and the ΔT between them is less than 55° C. The melting point must be below 150° C., which is the upper limit of the jetting temperature, or preferably below from about 145 to about 140° C. The melting point is preferably above 65° C. to prevent blocking and print transfer upon standing at temperatures up to 65° C., or more preferably above about 66° C. or above about 67° C. In addition to compounds of Formula III other suitable crystalline materials are illustrated in Table 2.

TABLE 2

| Crystalline Compound | Structure | $T_{melt}$ (° C.)* | $T_{crys}$ (° C.)* | ΔT (° C.) | η @ 140° C. (cps)** | η @ RT (cps)** |
|---|---|---|---|---|---|---|
| 1 | 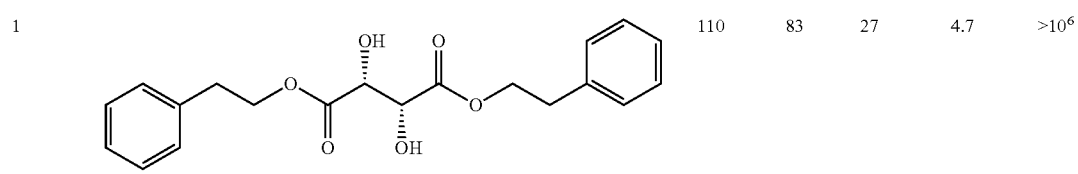 | 110 | 83 | 27 | 4.7 | >$10^6$ |

TABLE 2-continued

| Crystalline Compound | Structure | $T_{melt}$ (°C.)* | $T_{crys}$ (°C.)* | ΔT (°C.) | η @ 140° C. (cps)** | η @ RT (cps)** |
|---|---|---|---|---|---|---|
| 2 | (structure) | 98 | 71 | 27 | 2.9 | >10$^6$ |
| 3 | (structure) | 119 | 80 | 39 | 3.3 | >10$^6$ |
| 4 | (structure) | 125 | 75 | 50 | 3.0 | >10$^6$ |
| Target | | <140° C. | >65° C. | ≤50° C. | <10 cps | >10$^6$ cps |

*The samples were measured on a Q1000 Differential Scanning Calorimeter (TA Instruments) at a rate of 10° C./min from −50° C. to 200° C. to −50° C.; midpoint values are quoted.
**The samples were measured on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

The crystalline materials disclosed herein may show a sharp crystallization, relatively low viscosity (less than or equal to about 10$^1$ centipoise (cps), or from about 0.5 to about 20 cps, or from about 1 to about 15 cps) at a temperature of about 140° C., but very high viscosity (greater than about 10$^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The ΔT between $T_{melt}$ and $T_{crys}$ is less than about 55° C.

In some embodiments, the crystalline component may be present in an amount of from about 50 to about 85 weight percent. In some embodiments, the crystalline component is present in an amount of from about 60 to about 80 weight percent. In some embodiments, the crystalline component is present in an amount of from about 65 to about 75 weight percent. One skilled in the art will recognize that the exact choice of amount of the crystalline component may be influenced by, inter alia, the selection of the amorphous component of the ink composition.

The present embodiments provide ink compositions which comprises a blend of (1) crystalline and (2) amorphous components, generally in a weight ratio of from about 60:40 to about 95:5, respectively. In more specific embodiments, the weight ratio of the crystalline to amorphous component is from about 65:35 to about 95:5, or is from about 70:30 to about 90:10. In one embodiment, the weight ratio is 70:30 for the crystalline and amorphous components, respectively. In another embodiment, the weight ratio is 80:20 for the crystalline and amorphous components, respectively.

In embodiments, the ink carriers for the ink compositions may have melting points of from about 65° C. to about 150° C., for example from about 70° C. to about 140° C., from about 75° C. to about 135° C., from about 80° C. to about 130° C., or from about 85° C. to about 125° C. as determined by, for example, by differential scanning calorimetry at a rate of 10° C./min. In embodiments, the resulting ink has a melting point of from about 65 to about 140° C., or from about 65 to about 135° C., or from about 70 to about 130° C. In embodiments, the resulting ink has a crystallization point of from about 65 to about 130° C., or from about 66 to about 125° C., or from about 66 to about 120° C. In further embodiments, the resulting ink has a viscosity of from about 1 to about 15 cps, or from about 2 to about 14 cps, or from about 4 to about 12 cps at about 140° C. At room temperature, the resulting ink has a viscosity of about greater than or equal to about 10$^6$ cps.

The ink compositions disclosed herein may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink compositions disclosed herein may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis(4-(2-(3,5-di-tert-butyl-4-hydroxyhydrocinnamoyloxy))ethoxyphenyl)propane (TOPANOL-205, available from Vertellus); tris(4-tert-butyl-3-hydroxy-2,6-dimethyl benzyl)isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-tri-fluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis (trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD 76, NAUGARD 445, NAUGARD 512, and NAUGARD 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

In embodiments, the ink compositions described herein may also include a colorant. The ink compositions disclosed herein can thus be one with or without colorants. The solid ink may optionally contain colorants such as dyes or pigments. The colorants can be either from the cyan, magenta, yellow, black (CMYK) set or from spot colors obtained from custom color dyes or pigments or mixtures of pigments. Dye-based colorants are miscible with the ink base composition, which comprises the crystalline and amorphous components and any other additives.

In embodiments, the ink compositions described herein also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN(Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade BV); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the ink compositions disclosed herein. Examples of suitable pigments include PALIOGEN Violet 5100 (BASF); PALIOGEN Violet 5890 (BASF); HELIOGEN Green L8730 (BASF); LITHOL Scarlet D3700 (BASE); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In some embodiments, solvent dyes may be employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature.

In some embodiments, there are provided methods of printing, comprising incorporating an ink into an ink jet printing apparatus, wherein the ink comprises an amorphous component comprising a compound of Formula I:

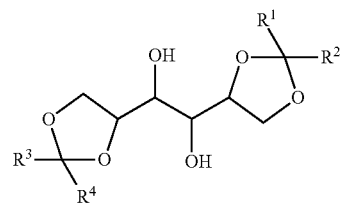

I wherein each of $R^1$, $R^2$, $R^3$, and $R^4$ independently comprises an optionally substituted $C_1$-$C_4$ alkyl, or each of $R^1$ together with $R^2$ and $R^3$ together with $R^4$ independently comprise a five- or six-membered ring cycloalkyl group, wherein each five- or six-membered ring cycloalkyl group is optionally substituted with a branched- or straight-chain alkyl, an aryl, an arylalkyl, an alkylaryl, or a halogen, and a crystalline component comprising a di-ester compound of Formula III:

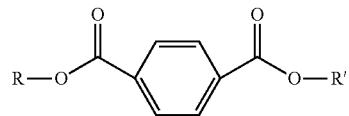

III wherein R and R' can be the same or different, and wherein R and R' each independently comprise a saturated or ethylenically unsaturated aliphatic group, the methods further comprising melting the ink inside the ink jet printing apparatus, and causing droplets of the melted ink to be ejected onto a substrate to form an image. In some such embodiments, methods disclosed herein employ substrates comprising a final recording sheet and droplets of the melted ink are ejected in an imagewise pattern directly onto the final recording sheet. In other embodiments, methods disclosed herein employ substrates comprising an intermediate transfer member and droplets of the melted ink are ejected in an imagewise pattern onto the intermediate transfer member followed by transfer of the imagewise pattern from the intermediate transfer member to a final recording sheet.

The inks disclosed herein can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Synthesis and Characterization of Amorphous D-Mannitol Acetals

This Example shows the preparation of amorphous D-mannitol acetals which may serve as amorphous components in ink compositions, in accordance with embodiments disclosed herein.

Preparation of Amorphous Compound 1

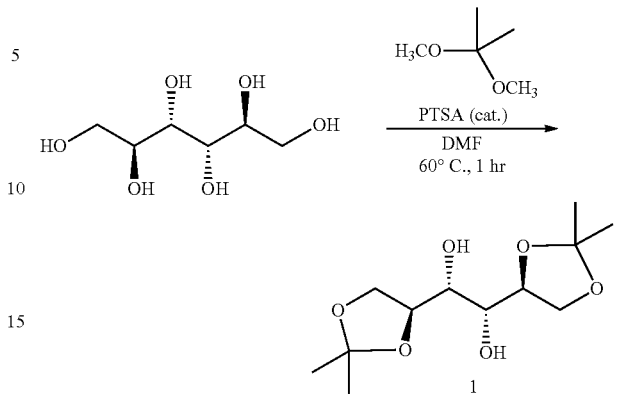

To a 250 mL 3-necked round-bottomed flask equipped with a magnetic stir bar was added D-mannitol (10 g, 54.9 mmol, from Aldrich Chemical), followed by DMF (N,N'-dimethylformamide) (Volume: 100 mL, from Calcdon Labs) with stirring. Next, added p-toluenesulfonic acid (p-TsOH (1.046 g, 5.5 mmol, from Aldrich Chemical), followed by 2,2-dimethoxypropane (14.40 mL, 117 mmol, from Aldrich Chemical). The reaction mixture was heated for one hour at 60° C. A clear golden solution was observed. The reaction was cooled to room temperature, and triethylamine (TEA) (5.2 mL, from Aldrich Chemical) was added to neutralize p-TsOH. The DMF solvent was removed by rotary evaporation, and the reaction product was extracted with water and ethyl acetate. The ethyl acetate was dried with $MgSO_4$, and the ethyl acetate was removed by rotary evaporation to furnish dimethyl acetal-mannitol gellant (9.25 g, 35.3 mmol, 64.2% yield) as a hazy gel. Characterization by $^1$H NMR spectroscopy indicated a pure product.

Preparation of Amorphous Compound 2

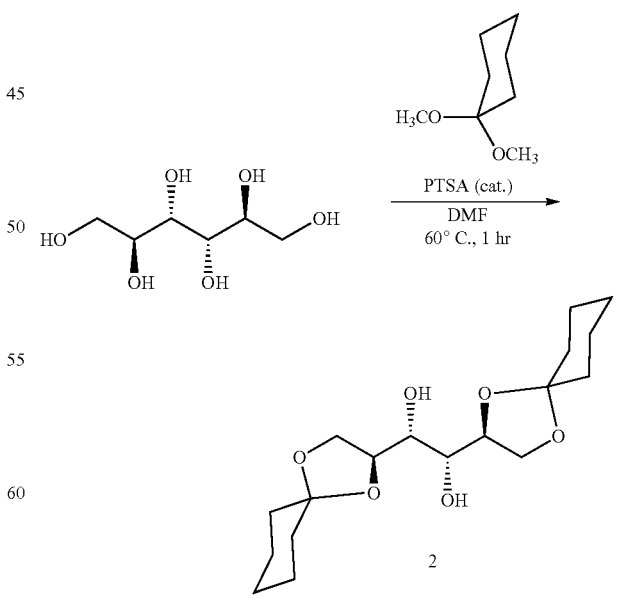

To a 250 mL 3-necked round-bottomed flask equipped with a magnetic stir bar was added D-mannitol (10 g, 54.9 mmol, from Aldrich Chemical), followed by DMF (N,N'-dimethylformamide) (Volume: 100 mL, from Calcdon Labs) with stirring. Next, added p-toluenesulfonic acid (p-TsOH (1.046 g, 5.5 mmol, from Aldrich Chemical), followed by 1,1'-dimethoxycyclohexane (16.90 mL, 113 mmol, from Alfa-Aesar). The reaction mixture was heated for one hour at 60° C. A clear golden solution was observed. The reaction was cooled to room temperature, and triethylamine (TEA) (5.2 mL, from Aldrich Chemical) was added to neutralize p-TsOH. The DMF solvent was removed by rotary evaporation, and the reaction product was extracted with water and ethyl acetate. The ethyl acetate was dried with MgSO4, and the ethyl acetate was removed by rotary evaporation to furnish cyclohexane 1,1'-dimethylacetal-mannitol gellant (14.96 g, 43.7 mmol, 80% yield) as a hazy gel. Characterization by $^1$H NMR spectroscopy indicated a pure product.

Preparation of Amorphous Compounds 3-6

Amorphous compounds 3-6 were prepared in the same fashion as compounds 1 and 2, but using 4-phenyl 1,1'-dimethoxyacetal (for compound 3), 4-tBu cyclohexane 1,1'-dimethoxyacetal (for compound 4), 3-methylcyclohexane 1,1'-dimethoxy acetal (for compound 5) and 4-methylcyclohexane 1,1'-dimethoxy acetal (for compound 6).

A summary of properties of amorphous compounds 1-6 are shown below in Table 3.

TABLE 3

| Amorphous Compound | X (Acetal) | Tg (° C.) | Viscosity @ 140° C. (cps) | % BRC (bio-renewable content) |
|---|---|---|---|---|
| 1 | 2,2-dimethoxypropane | ND | 6.73 | 69 |
| 2 | cyclohexane 1,1'-dimethoxyacetal | 18.6 | 31.6 | 53 |
| 3 | 4- phenyl cyclohexane 1,1'-dimethoxyacetal | 40.7 | 82.4 | 40 |
| 4 | 4-tBu cyclohexane 1,1'-dimethoxyacetal | 46.3 | 29.7 | 37 |
| 5 | 3-methylcyclohexane 1,1'-dimethoxy acetal | 21.4 | 27.6 | 49 |
| 6 | 4-methylcyclohexane 1,1'-dimethoxy acetal | 14.6 | 22.6 | 49 |

A test was conducted to determine the stability of compound 2 of Table 3 at the high jetting temperatures over a prolonged period of time. Compound 2 was aged in the oven at 130° C. for seven days to test its stability. FIG. 1 shows the rheology of the aged and fresh samples indicating no significant increase in viscosity on aging indicating that this material is stable at high jetting temperatures.

Example 2

Preparation and Characterization of Ink Formulations

This Example shows the preparation and characterization of ink compositions, in accordance with embodiments disclosed herein.

Five inks comprising amorphous D-mannitol acetals 2-6, crystalline component distearyl terephthalate (DST), and a pigment concentrate were prepared according to the following procedures outlined below. DST was prepared as follows:

A 2 L Buchi reactor equipped with a double turbine agitator and distillation apparatus was charged with dimethyl terephthalate (315.8 grams), and stearyl alcohol (879.7 grams) and the mixture heated to 130° C. under nitrogen purge for one hour, after which stirring was commenced followed by the addition of TYZOR® catalyst (3.0 grams, available from Dupont). The reaction mixture was then heated to 145° C., followed by slow ramping of the temperature to 190° C. over a 3-4 hour period allowing methanol to be distilled in a controlled manner. The reaction temperature was maintained at 190° C. for an additional 16 hours until greater than about 96% conversion to the product was achieved as determined by $^1$H NMR spectroscopy. The product was discharged as a low viscosity liquid which solidified on cooling to give a 1,050 gram of a white solid (96.2% yield). The product was indicated to be pure by $^1$H NMR spectroscopy with only trace amounts of the mono-ester.

Exemplary Ink Formulation Preparation

In a 50 mL beaker was added 1.00 g pigment concentrate B4G (available from Clariant Corporation, Conventry, R.I.), 7.09 g DST, and 1.91 g bis(cyclohexane 1,1'acetal) D-mannitol (compound 2 in Table 3). The mixture was then stirred at 130° C. for two hours and then poured into a pan to freeze. The resultant phase change ink (Ink Formulation 1) was ready for characterization, as described further below.

Ink Formulations 2-5 were prepared using the same procedure as Ink Formulation 1 according to the quantities shown in the Ink Formulation Tables below:

| Component | wt % | m (g) |
|---|---|---|
| Ink Formulation 1 | | |
| distearyl terephthalate (DST, crystalline) | 70.9 | 7.09 |
| Bis (cyclohexane 1,1'acetal) D-mannitol 2 | 19.1 | 1.91 |
| 20% Pigment concentrate B4G | 10.0 | 1.00 |
| TOTAL | 100.00 | 10.00 |
| Ink Formulation 2 | | |
| distearyl terephthalate (DST, crystalline) | 70.9 | 7.09 |
| Bis (4-t-Bu cyclohexane 1,1'acetal) D-mannitol 3 | 19.1 | 1.91 |
| 20% Pigment concentrate B4G | 10.0 | 1.00 |
| TOTAL | 100.00 | 10.00 |
| Ink Formulation 3 | | |
| distearyl terephthalate (DST, crystalline) | 70.9 | 7.09 |
| Bis (4-phenyl cyclohexane 1,1'acetal) D-mannitol 4 | 19.1 | 1.91 |
| 20% Pigment concentrate B4G | 10.0 | 1.00 |
| TOTAL | 100.00 | 10.00 |
| Ink Formulation 4 | | |
| distearyl terephthalate (DST, crystalline) | 70.9 | 7.09 |
| Bis (3-methyl cyclohexane 1,1'acetal) D-mannitol 5 | 19.1 | 1.91 |
| 20% Pigment concentrate B4G | 10.0 | 1.00 |
| TOTAL | 100.00 | 10.00 |
| Ink Formulation 5 | | |
| distearyl terephthalate (DST, crystalline) | 70.9 | 7.09 |
| Bis (4-methyl cyclohexane 1,1'acetal) D-mannitol 6 | 19.1 | 1.91 |
| 20% Pigment concentrate B4G | 10.0 | 1.00 |
| TOTAL | 100.00 | 10.00 |

Figure 2:
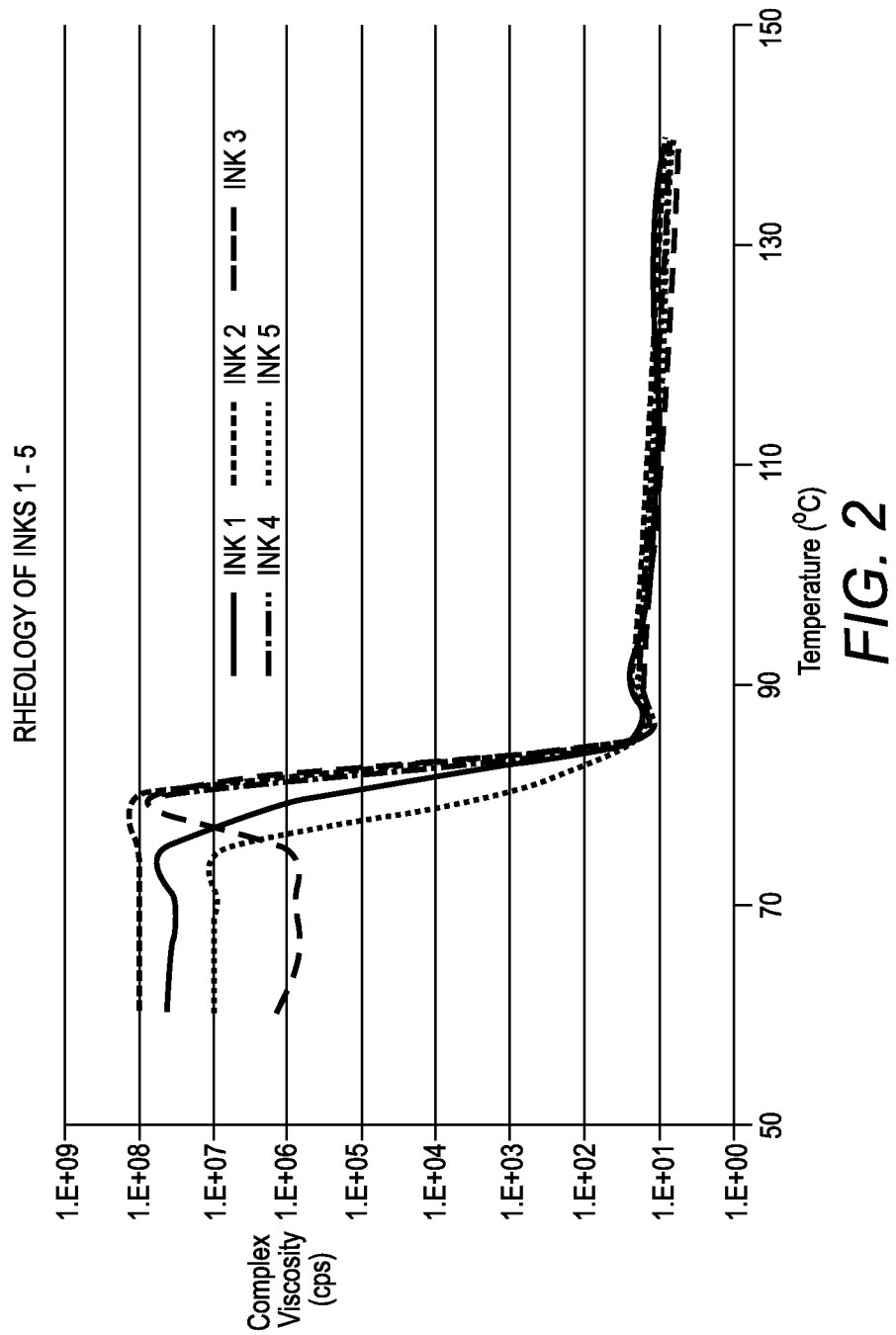
FIG. 2 shows viscosity measurements of Ink Formulations 1-5.

Ink rheology was measured for all five inks as indicated in FIG. 2 and Table 4. FIG. 2 shows a plot of complex viscosity of the ink formulations as a function of temperature. Table 4 indicates the viscosity at 140° C. and the percentage of bio-renewable for the ink formulations.

TABLE 4

| Ink Formulation | Viscosity @ 140° C. (cps) | % BRC (bio-renewable content) |
|---|---|---|
| 1 | 8.43 | 71 |
| 2 | 7.93 | 69 |
| 3 | 6.21 | 68 |
| 4 | 7.14 | 70 |
| 5 | 6.48 | 71 |

These results indicated that Ink Formulations 1-5 exhibit appropriate viscosity characteristics for ink jet applications.

To test the robustness of prints employing Ink Formulations 1-5, the inks were K-proofed on coated paper (DCEG: Xerox Colour Elite Gloss, 120 gsm). The K-proof sample was duplicated for scratch, fold, and fold offset examination. K-proof samples of control inks were prepared in the same manner as the control samples. Then, the K-proofs were spread by feeding each print through a Typhoon fixture at 1 inch/second at a drum and paper temperature of 50° C. with the ink surface facing the transfix drum.

One K-proof of each ink was then scratched using the XRCC three-finger gouge system, and another K-proof folded along with a Xerox Business 4200 (75 gsm) facing page in a Formax folder at 100% speed and evaluated for fold crease and fold offset. Evaluation was done by using SIR and comparing with other inks. The results are summarized in Table 4 below.

TABLE 4

| Ink Formulation | Fold Offset SIR Grade | Fold Crease SIR Grade | Scratch SIR Grade |
|---|---|---|---|
| 1 | 2.5 | 2 | 3 |
| 2 | 2 | 2 | 3 |
| 3 | 2 | 3 | 3 |
| 4 | 2.5 | 2 | 2 |
| 5 | 2 | 3 | 2 |
| Ink control 1 | 2 | 1 | 2 |
| Ink control 2 | 1 | 1 | 1 |
| Ink control 3 | 2.5 | 5 | 5 |

Ink Formulations 1-5 showed better robustness than control inks in terms of scratch, fold crease, and fold offset (SIR grade of 2-3 for the amorphous D-mannitol acetal-containing ink vs. 1-2 for the Ink control 1 that uses an amorphous TBCT ester. Ink control 2 and Ink control 3 are commercially available inks.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An ink composition comprising:
   an amorphous component comprising a modified polyol; and
   a crystalline component;
   wherein the modified polyol comprises an alditol bis-acetal and a bio-renewable content of at least 35% by weight.

2. The ink composition of claim 1, wherein the bio-renewable content of the modified polyol is in a range of from about 50% to about 70% by weight.

3. The ink composition of claim 1, wherein the ink composition comprises a viscosity in a range of from about 4 to about 12 centipoise at 140° C.

4. The ink composition of claim 1, wherein the modified polyol comprises a compound of Formula I:

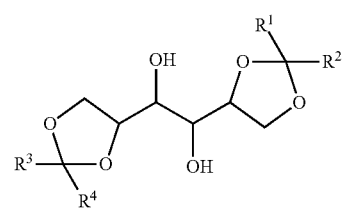

wherein each of $R^1$, $R^2$, $R^3$, and $R^4$ independently comprises an optionally substituted $C_1$-$C_4$ alkyl, or each of $R^1$ together with $R^2$ and $R^3$ together with $R^4$ independently comprise a five- or six-membered ring cycloalkyl group, wherein each five- or six-membered ring cycloalkyl group is optionally substituted with a branched- or straight-chain alkyl, an aryl, an arylalkyl, an alkylaryl, or a halogen.

5. The ink composition of claim 4, wherein each of $R^1$ together with $R^2$ and $R^3$ together with $R^4$ comprise a cyclohexyl group.

6. The ink composition of claim 5, wherein each cyclohexyl group independently comprises a substitution selected from methyl, ethyl, n-propyl, isopropyl, n-butyl, i-butyl, t-butyl, or optionally substituted phenyl.

7. The ink composition of claim 5, wherein each cyclohexyl group comprises t-butyl substitution.

8. The ink composition of claim 5, wherein each cyclohexyl group comprises phenyl substitution.

9. The ink composition of claim 5, wherein each cyclohexyl group comprises methyl substitution.

10. The ink composition of claim 5, wherein each cyclohexyl group substitution is attached at the 4 position of the cyclohexyl group.

11. The ink composition of claim 1, wherein the modified polyol comprises a compound of Formula II:

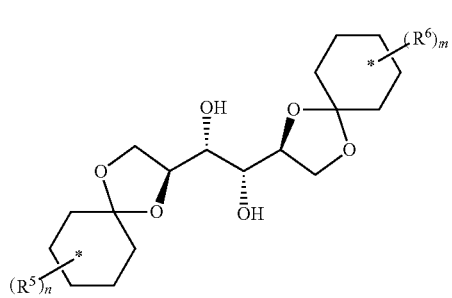

wherein $R^5$ and $R^6$ comprise a substitution selected from methyl, ethyl, n-propyl, isopropyl, n-butyl, 1-butyl, t-butyl, or optionally substituted phenyl, and m and n are independently an integer from 0 to 3.

12. The ink composition of claim 1, wherein the amorphous component is present in an amount of from about 5 to about 40 weight percent.

13. The ink composition of claim 1, wherein the crystalline component comprises a di-ester compound of Formula III:

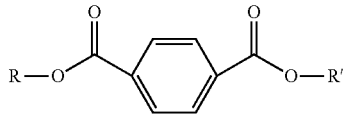

wherein R and R' can be the same or different, and wherein R and R' each independently comprise a saturated or ethylenically unsaturated aliphatic group.

14. The ink of claim 9, wherein the crystalline component comprises a distearyl terephthalate.

15. The ink of claim 1, wherein the crystalline component is present in an amount of from about 50 to about 95 weight percent.

16. The ink of claim 1, further comprising a colorant.

17. An ink comprising:
   an amorphous component comprising a D-mannitol bis-acetal;
   a crystalline component; and
   a colorant.

18. The ink of claim 17, wherein the D-mannitol bis-acetal comprises a bio-renewable content in a range of from about 50% to about 70% by weight.

19. An ink composition comprising:
   an amorphous component comprising a modified polyol; and
   a crystalline component;
      wherein the modified polyol comprises a bio-renewable content of at least 35% by weight.

* * * * *